(12) United States Patent
Saeed (10) Patent No.: US 8,458,515 B1
(45) Date of Patent: Jun. 4, 2013

(54) RAID5 RECOVERY IN A HIGH AVAILABILITY OBJECT BASED FILE SYSTEM

(75) Inventor: Tariq Saeed, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 597 days.

(21) Appl. No.: 12/619,314

(22) Filed: Nov. 16, 2009

(51) Int. Cl.
*G06F 11/00* (2006.01)

(52) U.S. Cl.
USPC .................. 714/6.22; 714/6.24; 714/770

(58) Field of Classification Search
USPC .................. 714/6.22, 6.24, 770
See application file for complete search history.

(56) References Cited

U.S. PATENT DOCUMENTS

| | | | | |
|---|---|---|---|---|
| 5,191,584 | A | * | 3/1993 | Anderson ............... 714/6.24 |
| 5,388,108 | A | * | 2/1995 | DeMoss et al. ........... 714/6.12 |
| 5,408,644 | A | * | 4/1995 | Schneider et al. .......... 714/1 |
| 5,506,977 | A | * | 4/1996 | Jones ................... 711/155 |
| 5,737,744 | A | * | 4/1998 | Callison et al. ........... 711/114 |
| 5,852,724 | A | | 12/1998 | Glenn et al. |
| 5,946,685 | A | | 8/1999 | Cramer et al. |
| 5,996,089 | A | * | 11/1999 | Mann et al. ............. 714/6.31 |
| 6,230,246 | B1 | | 5/2001 | Lee et al. |
| 6,353,898 | B1 | | 3/2002 | Wipfel et al. |
| 6,360,331 | B2 | | 3/2002 | Vert et al. |
| 6,389,433 | B1 | | 5/2002 | Bolosky et al. |
| 6,421,777 | B1 | | 7/2002 | Pierre-Louis et al. |
| 6,438,642 | B1 | | 8/2002 | Shaath |
| 6,438,705 | B1 | | 8/2002 | Chao et al. |
| 6,493,811 | B1 | | 12/2002 | Blades et al. |
| 6,513,051 | B1 | | 1/2003 | Bolosky et al. |
| 6,526,521 | B1 | | 2/2003 | Lim |
| 6,587,959 | B1 | | 7/2003 | Sjolander et al. |
| 6,624,750 | B1 | | 9/2003 | Marman et al. |
| 6,629,266 | B1 | | 9/2003 | Harper et al. |
| 6,738,345 | B1 | | 5/2004 | Williamson |
| 6,754,664 | B1 | | 6/2004 | Bush |
| 6,754,781 | B2 | | 6/2004 | Chauvel et al. |
| 6,763,479 | B1 | | 7/2004 | Hebert |
| 6,799,316 | B1 | | 9/2004 | Aguilar et al. |

(Continued)

OTHER PUBLICATIONS

Quéma, et al., "An asynchronous middleware for Grid resource monitoring" (abstract), Sep. 2003, 2 pages, downloaded from http://www3.interscience.wiley.com/journal/107638010/abstract?CRETRY=1&SRETRY=0.

(Continued)

*Primary Examiner* — Philip Guyton
(74) *Attorney, Agent, or Firm* — Rory D. Rankin; Meyertons, Hood, Kivlin, Kowert & Goetzel, P.C.

(57) ABSTRACT

A system and method for supporting asynchronous write operations within data storage systems and repairing a failed component within data storage subsystems without interruption of service. A data storage cluster is coupled to a client. The cluster comprises a plurality of data storage locations addressable as rows and columns in an array. Each column of the array comprises a separate computer of a plurality of computers interconnected to each other via a network. A coordinating column corresponding to a particular row receives data from the client for storage in the row and sends an indication of storage completion to the client, in response to forwarding the received data to data storage locations within the row. Although the client receives a write complete status before the data is actually written in corresponding computers, the cluster has sufficient information to complete the write operation even in the event of a column being temporarily offline.

19 Claims, 8 Drawing Sheets

U.S. PATENT DOCUMENTS

| | | | |
|---|---|---|---|
| 6,920,537 B2 | 7/2005 | Ofek et al. | |
| 6,922,791 B2 | 7/2005 | Mashayekhi et al. | |
| 6,943,828 B1 | 9/2005 | Grimes et al. | |
| 6,944,788 B2 | 9/2005 | Dinker et al. | |
| 6,983,365 B1 | 1/2006 | Douceur et al. | |
| 7,137,040 B2 | 11/2006 | Bae et al. | |
| 7,200,604 B2 | 4/2007 | Forman et al. | |
| 7,302,593 B2 | 11/2007 | Rothman et al. | |
| 7,310,644 B2 | 12/2007 | Adya et al. | |
| 7,359,920 B1 | 4/2008 | Rybicki et al. | |
| 7,376,722 B1 | 5/2008 | Sim et al. | |
| 7,424,514 B2 | 9/2008 | Noble et al. | |
| 7,478,113 B1 | 1/2009 | De Spiegeleer et al. | |
| 2001/0011879 A1* | 8/2001 | Erdman | 318/773 |
| 2003/0041057 A1 | 2/2003 | Hepner et al. | |
| 2003/0079154 A1 | 4/2003 | Park et al. | |
| 2003/0097422 A1 | 5/2003 | Richards et al. | |
| 2003/0126242 A1 | 7/2003 | Chang | |
| 2003/0163780 A1 | 8/2003 | Kossa | |
| 2004/0083358 A1 | 4/2004 | Zhou et al. | |
| 2004/0089482 A1 | 5/2004 | Ramsden et al. | |
| 2004/0158777 A1 | 8/2004 | Bae et al. | |
| 2004/0268340 A1 | 12/2004 | Steeb et al. | |
| 2005/0015780 A1 | 1/2005 | McKeon et al. | |
| 2005/0055418 A1 | 3/2005 | Blanc et al. | |
| 2005/0091375 A1 | 4/2005 | Straub et al. | |
| 2005/0172161 A1 | 8/2005 | Cruz et al. | |
| 2005/0188265 A1 | 8/2005 | Pomaranski et al. | |
| 2005/0198328 A1 | 9/2005 | Lee et al. | |
| 2005/0204183 A1 | 9/2005 | Saika | |
| 2005/0216813 A1 | 9/2005 | Cutts et al. | |
| 2005/0223278 A1 | 10/2005 | Saika | |
| 2005/0283636 A1 | 12/2005 | Vasudevan et al. | |
| 2005/0289390 A1 | 12/2005 | Baba | |
| 2006/0015773 A1 | 1/2006 | Singh et al. | |
| 2006/0053337 A1 | 3/2006 | Pomaranski et al. | |
| 2006/0085418 A1 | 4/2006 | Piper et al. | |
| 2006/0161637 A1 | 7/2006 | Friess et al. | |
| 2006/0168192 A1 | 7/2006 | Sharma et al. | |
| 2007/0206611 A1 | 9/2007 | Shokri et al. | |
| 2007/0255819 A1 | 11/2007 | Hua et al. | |

OTHER PUBLICATIONS

"Using the Event Monitoring Service", Hewlett-Packard Corp., Nov. 1999, 102 pages.

Baker, et al, "javaGMA: A lightweight implementation of the Grid Monitoring Architecture," UKUUG LISA/Winter Conference, High-Availability and Reliability, Bournemouth, Feb. 25-26, 2004, http://www.ukuug.org/events/winter2004/speakers+abstracts.shtml#id2717511.

Cottrell, "Network Monitoring Tools," Stanford Linear Accelerator Center, Stanford University, Palo Alto, CA, Nov. 24, 2007, 29 pages. (Printed from http://www.slac.stanford.edu/xorg/nmtf/nmtf-tools.html).

VERITAS Cluster Server 4.0 User's Guide, VERITAS Corp., Jan. 2004, 715 pages.

VERITAS Software Corporation, "Comprehensive Application Performance Management with VERITAS i3™," 2003, 3 pages.

VERITAS Software Corporation, "VERITAS Enterprise Server Automation," 2003, 8 pages.

VERITAS Software Corporation, "Server Consolidation with Veritas OpForce; Optimizing your Infrastructure Availability and Utlizations," 2003, 6 pages.

VERITAS Software Corporation, "Server Automation with Veritas OpForce; Enterprise Operations Automation-Enhancing Workflows, Administration, and Management," 2003, 6 pages.

VERITAS Software Corporation, "Rapid Server Deployment with VERITAS OpForce; The Enterprise-Scale, Server Deployment Solution for Heterogeneous Environments," 2003, 6 pages.

VERITAS Software Corporation, "High Availability Clustering in a Microsoft Windows Environment; VERITAS Cluster Server for Microsoft Windows NT" 2000, 20 pages.

VERITAS Software Corporation, "VERITAS Cluster Server v2.0; Technical Overview," 2001, 12 pages.

VERITAS Software Corporation, "Managing Application Availability with Application Clustering and the VERITAS Cluster Server Version 2.0," 2002, 32 pages.

"SAP High Availability (BC-CCM-HAV)", Release 4.6C, Copyright Apr. 2001, pp. 1-258.

\* cited by examiner

RAID5 RECOVERY IN A HIGH AVAILABILITY OBJECT BASED FILE SYSTEM

BACKGROUND OF THE INVENTION

1. Field of the Invention

This invention relates to computer systems and, more particularly, to servicing asynchronous write requests and repairing a failed component within data storage subsystems without interruption of service.

2. Description of the Related Art

Computer systems frequently include data storage subsystems for storing data. In particular, computer systems that include multiple clients interconnected by a network increasingly share one or more data storage subsystems via a network. The data storage subsystems may include or be further coupled to storage consisting of one or more disk storage devices, tape drives, or other storage media. A computer system may also include one or more servers in which metadata describing the contents of the included storage devices is maintained.

Data storage subsystems may store data with some redundancy to allow for recovery from storage errors. There are a variety of techniques to store data redundantly, including erasure coding techniques such as Reed-Solomon encodings and RAID (Redundant Array of Independent Disks) using a variety of layouts, such as RAID-1, RAID-5, or RAID-6. These RAID layouts may be implemented within an object-based file system in which each independent storage device is treated as a disk. Each client device may convey data to the storage devices via a network.

Unfortunately, some way of arbitrating write access requests from multiple clients may be needed to avoid introducing inconsistencies into the redundant data. One approach may include performing all of the functions involved in sequencing writes using a lock mechanism. For example, in the case of RAID-5 or RAID-6, these functions may include reading old data and old parity, computing new parity, logging the new data and new parity, and writing the new data and new parity to their respective storage locations that together constitute a part of or the whole of a row in the RAID layout. In addition, information may be retrieved from a Meta Data Server (MDS) for each write to an individual location in the RAID layout. The performance of these functions increases write latency and adds complexity and significant computational and storage overhead to each client.

Taking RAID-5 layout for example, user data may be divided into fixed size units called stripe units. Each stripe may be stored on a separate disk in which all disks may be physically co-located. The number of such devices may be configurable and once chosen may remain fixed. Each disk may generally be referred to as columns. Data may then be striped in rows across these columns. In each row, one column may hold a binary sum, called parity, of the remaining columns. The column holding the parity may rotate with each successive row. It is customary to speak of a RAID-5 layout as RAID n+1, since data is in n columns and parity is in 1 column. If any device fails, lost data may be reconstructed by summing the remaining columns—such as with a binary exclusive-or function. For data writes of size less than n, called a partial stripe, parity can be computed using a technique referred to as read-modify-write. In this manner, all columns are read, data is overlayed on top of the read data, and parity is computed. One problem with this approach is the high use of input/output (I/O) bandwidth for reading all columns, even if only one byte is written. Also, latency is increased due to extra read operations when only a write operation is performed on a subset of the columns, perhaps only one. Therefore, I/O performance suffers.

In view of the above, systems and methods for supporting asynchronous write operations within data storage systems and repairing a failed component within data storage subsystems without interruption of service are desired.

SUMMARY OF THE INVENTION

Various embodiments of a computer system and methods are disclosed.

In one embodiment, a data storage cluster is coupled to a client device. The cluster comprises a plurality of data storage locations addressable as rows and columns in an array. Each column of the array comprises a separate computer of a plurality of computers interconnected via a network. Each row may have a single corresponding coordinating computer, or column. This coordinating column may be configured to receive data from clients for storage in the corresponding row. In response to a write request from a client, the coordinating column may send a write completion indication to the client, responsive to forwarding the received data to data storage locations within the given row. Although the client may receive a write complete indication before the data is actually written in corresponding computers, the cluster has sufficient information to complete the write operation even in the event of a column failure, wherein a computer is temporarily offline.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Figure 1:
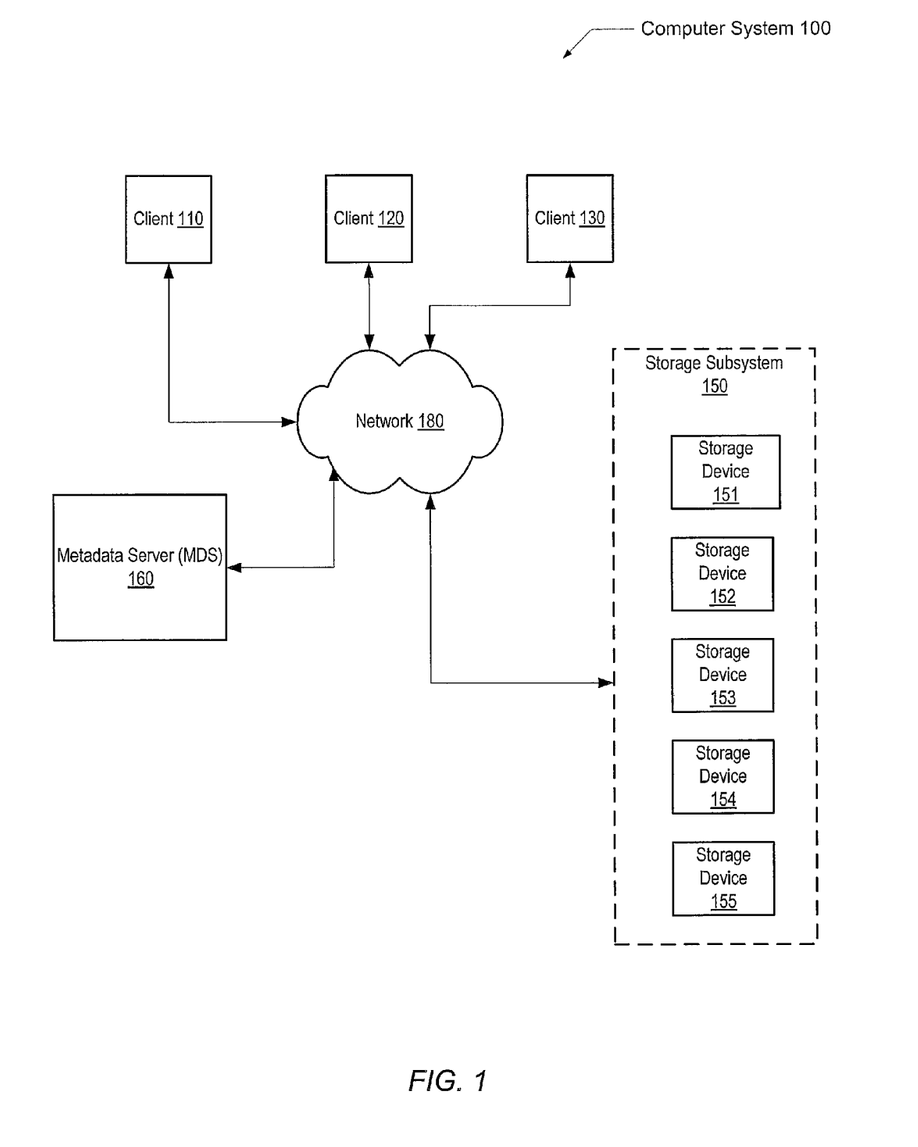
FIG. 1 illustrates one embodiment of a computer system.

FIG. 1 illustrates one embodiment of a computer system 100. As shown, system 100 includes clients 110, 120, and 130, a storage subsystem 150, and a metadata server (MDS) 160 interconnected through a network 180. Clients 110, 120, and 130 are representative of any number of stationary or mobile computers such as desktop PCs, workstations, laptops, handheld computers, blade servers, etc. Although system 100 is described as including client and servers, in alternative embodiments the functions performed by clients and servers may be performed by peers in a peer-to-peer configuration or by a combination of clients, servers, and peers.

In alternative embodiments, the number and type of clients, servers, and storage devices is not limited to those shown in FIG. 1. Almost any number and combination of servers, desktop, and mobile clients may be interconnected in system 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to system 100.

Within system 100, it may be desired to store data associated with any of clients 110, 120, and 130 within storage subsystem 150. Subsystem 150 may include individual storage devices 151-155. Storage devices 151-155 may be any of a variety of devices such as hard disks, server blades, or specialized devices, and may include a variety of memory devices such as RAM, Flash RAM, MEMS (MicroElectro-Mechanical Systems) storage, battery-backed RAM, and/or non-volatile RAM (NVRAM), etc. In one embodiment, each storage device may be a separate computer. Then storage subsystem 150 may comprise separate individual computers 151-155. In another embodiment, each separate computer may be interconnected with other separate computers via network 180. Therefore, rather than subsystem 150 have an interface with network 180, each separate computer 151-155 may have an interface with network 180 in order to communicate with clients 110-130, other computers within subsystem 150, or other.

Client data may be stored within storage subsystem 150 in one of a variety of well-known layouts, such as RAID-1, RAID-DP, RAID-5, RAID-6, an erasure-coded data representation scheme, etc., in which the reliability of storage may be enhanced by redundancy and/or error correction capabilities. Metadata associated with the layout of data stored in storage subsystem 150 may be stored in MDS 160. A client may retrieve metadata from MDS 160 in order to identify a desired data storage location within storage subsystem 150. In alternative embodiments, the functions of MDS 160 may be performed by any of a variety of components such as a volume configuration daemon or other storage management processes or servers depending on the type and layout of storage devices in storage subsystem 150.

In the following discussion, data may be stored in stripe units of a given size that depends on the capacity of individual storage device locations. These stripe units may be data objects, data portions, chunks, or any other segment of data suited to the individual storage devices. However, from the client view, data stripe units may be of a different size. For example, a client may convey data to a storage subsystem in stripe units of a size sufficient to fill a row across a number of storage devices arranged in an array. A client may also convey data in a size smaller than a stripe unit. A variety of stripe layouts are possible and contemplated, some of which are described in further detail below.

For a given row within storage subsystem 150, one of the storage devices may be designated as a coordinating storage device. In some embodiments, data may be stored without parity and the coordinating storage device in each row may coordinate storage of individual stripe units in the other storage devices in the row. In another embodiment involving redundant layouts, the coordinating storage device may coordinate storage of data as well as coordinating parity computation. In yet another embodiment, a separate computer may comprise a storage device, wherein the computers, or columns, are interconnected via a public network. One computer may be designated as a coordinating column for a particular row. This coordinating column may coordinate storage of data within other columns of the particular row and coordinate parity computation. Numerous such alternatives are possible and are contemplated.

Figure 2:
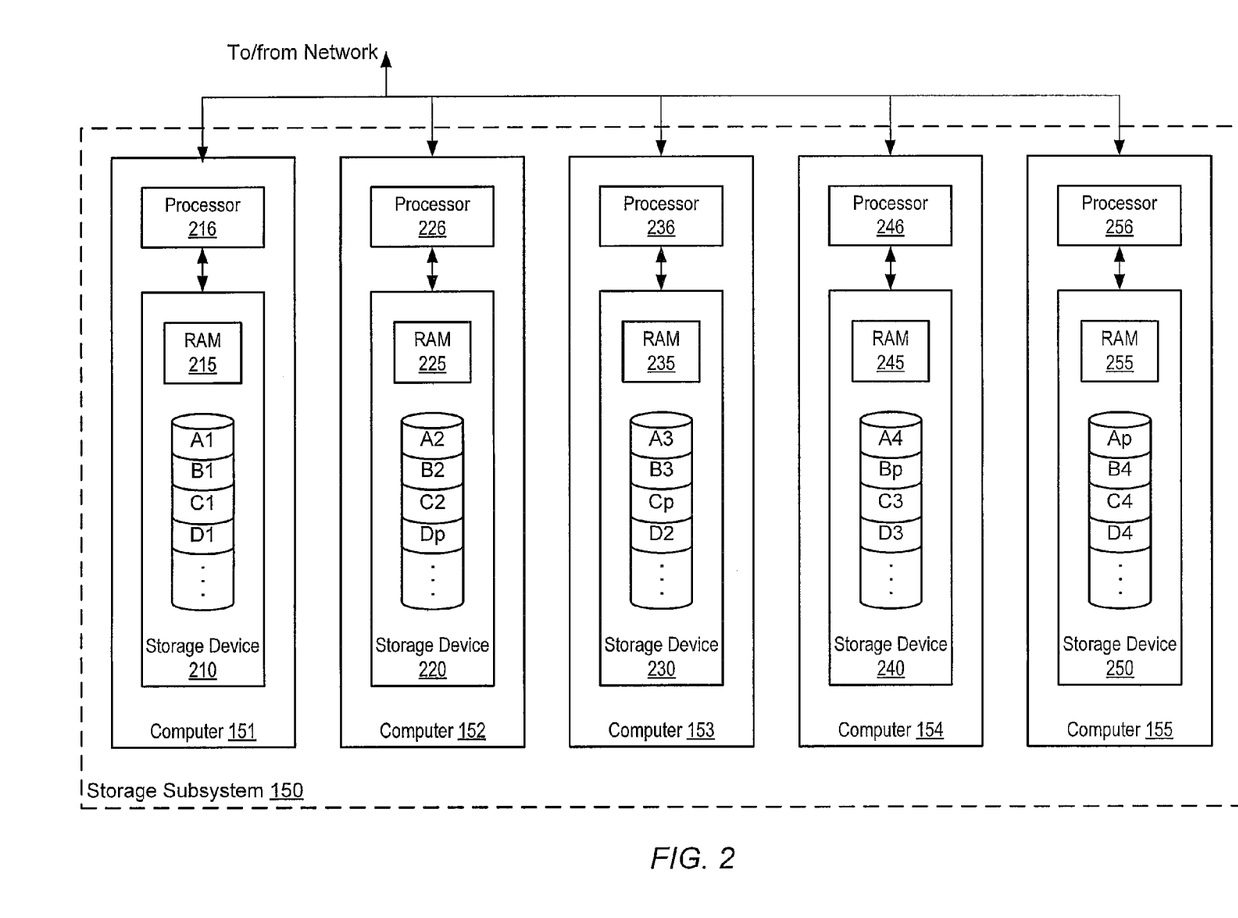
FIG. 2 is a generalized block diagram of one embodiment of a RAID-5 data storage subsystem.

Turning now to FIG. 2, a generalized block diagram of one embodiment of storage subsystem 150 is shown. In the illustrated embodiment, storage subsystem 150 may include separate computers 151-155. These computers may include a processors 216, 226, 236, 246, and 256. Each processor may comprise one or more processor cores, or cores. Each processor core may utilize conventional processor design techniques such as complex branch prediction schemes, out-of-order execution, and register renaming techniques. Each core may execute one or more threads. Each core 102 may include circuitry for executing instructions according to a predefined instruction set. For example, the SPARC instruction set architecture (ISA) may be selected. Alternatively, the x86, Alpha, PowerPC, or any other instruction set architecture may be selected. Generally, processor core 102 may access a cache memory subsystem for data and instructions. Each core may contain its own level 1 (L1) and level 2 (L2) caches in order to reduce memory latency. These cache memories may be integrated within respective processor cores. Alternatively, these cache memories may be coupled to processor cores in a backside cache configuration or an inline configuration, as desired. The L1 cache may be located nearer a processor core both physically and within the cache memory hierarchy.

The separate computers or servers 151-155 may also include storage devices 210, 220, 230, 240, and 250, arranged in a RAID-5 layout. Each of storage devices 210, 220, 230, 240, and 250 includes a corresponding one of a set of temporary storage devices 215, 225, 235, 245, and 255 such as random access memory (RAM). In one embodiment, storage devices 215, 225, 235, 245, and 255 may include non-volatile RAM (NVRAM). Data may be stored in stripe units striped in rows across the storage devices.

In various RAID-5 embodiments, there may be a parity storage device and at least two data storage devices in each row, depending on the number of storage devices in the layout. For example, in the illustrated embodiment, a row may be defined as five stripe units each stored on one of storage devices 210, 220, 230, 240, and 250. Data may be striped across a portion of a row, a full row, or more than one row. In one embodiment, each row may include four data stripe units and a parity stripe unit. More particularly, the first row in the illustrated embodiment may include data stripe units A1, A2, A3, and A4 and parity stripe unit Ap stored in storage devices 210, 220, 230, 240, and 250, respectively. The second row may include data stripe units B1, B2, B3, and B4 and parity stripe unit Bp. Unlike the first row in which the parity stripe unit Ap was stored in storage device 250, the parity stripe unit Bp may be stored in storage device 240, while the data stripe units B1, B2, B3, and B4 may be stored in storage devices 210, 220, 230, and 250, respectively. The location of the parity stripe unit may be rotated among the storage devices on each successive row such as rows C and D, etc.

During operation, a client may write data to a given row as if writing to a RAID-0 layout. More specifically, the client may be told that the data is striped such that for each RAID-5 row, the entire row is stored in the storage device holding the parity stripe unit that is designated for that row and the stripe size is equal to the combined size of the other, non-parity stripe units in the row. The client may then send data for the entire row to the parity storage device. The parity storage device may then forward the one or more portions of the data to the component data storage devices in the given row according to a process that will be described in more detail below. Each storage device may store the parity or data in its associated RAM until the new parity has been calculated, at which time the write operation may be committed and the data and parity may be transferred from RAM to the associated stripe unit locations. The storage subsystem may return a write completion message to the client after the data and parity stripe units are stored in RAM but before the data and parity are transferred from RAM to the associated stripe unit locations, minimizing write latency. A dataset that is larger than the capacity of a single row may be written through a series of write operations, each having a width of one row or less and each being addressed to the corresponding parity storage device in its respective row.

Read operations may be handled in a similar manner. For example, a read request may also be sent from a client to the parity storage device in a given row. If the requested data is stored in the RAM associated with the parity storage device, the data may be retrieved and sent directly to the client in a response to the request. If the requested data is located on one or more other storage devices making up the row, the parity storage device may convey a corresponding read request to each storage device in the layout and receive in return a portion of the requested data. The parity storage device may then assemble the data and return it to the requesting client. If one or more portions of the data are located on a storage device that has failed, the parity storage device may retrieve the data from a sufficient number of the remaining storage devices making up the row and then reconstruct the missing data using the available data and parity.

Figure 3:
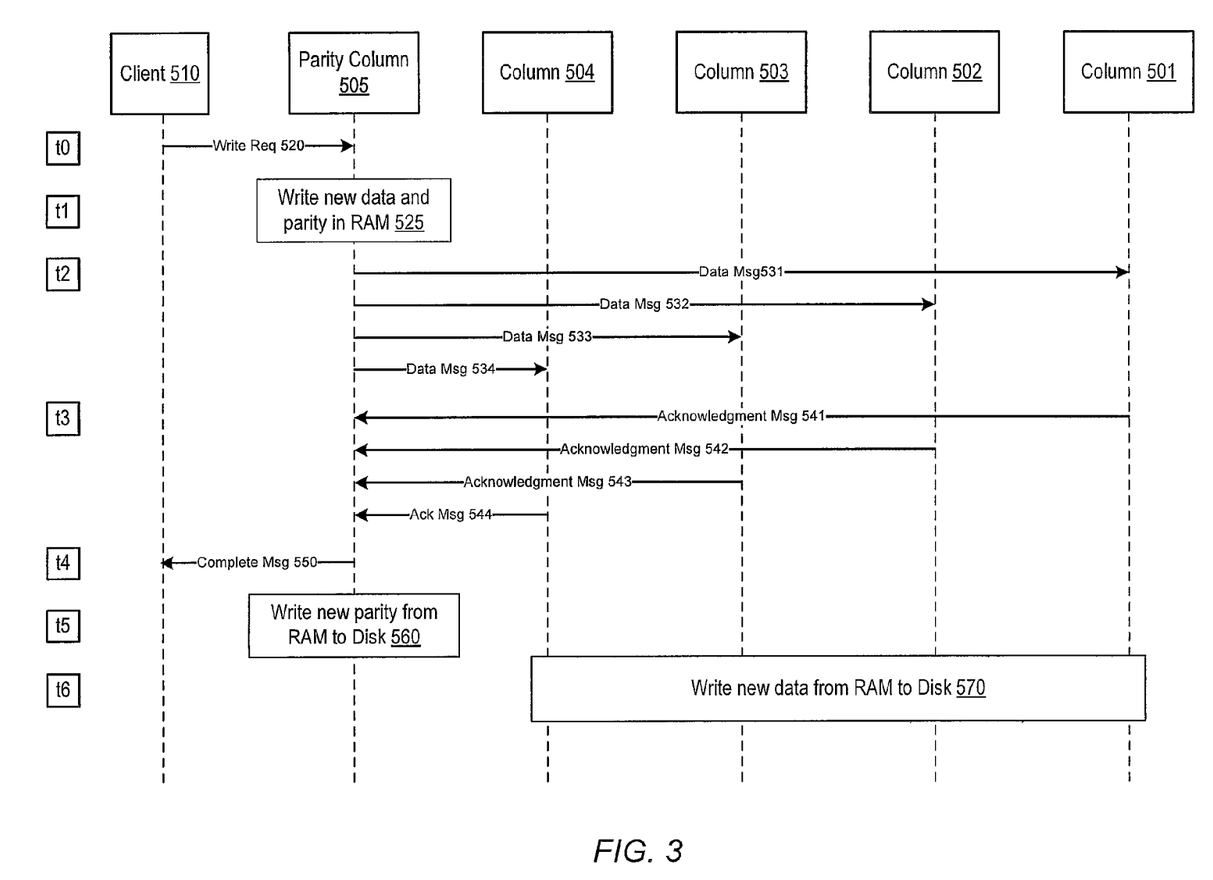
FIG. 3 is a sequence diagram illustrating one embodiment of a write transaction between a client and a row in a RAID-5 layout.

FIG. 3 is a sequence diagram illustrating one embodiment of a write transaction between a client and a row in a RAID-5 layout. In the illustrated embodiment, a client 510 is shown writing data to a row consisting of columns 501-504 and parity column 505. Here, the data storage devices are referred to as columns 501-504 and the parity storage device is referred to as parity column 505. An array is formed with rows striped across the columns. Data storage locations within this array may be addressable by corresponding rows and columns 501-504. As described earlier, in one embodiment, each column 501-504 may be a separate computer interconnected with other columns of the array via a network.

In this example, the data size is assumed to be equal to the capacity of one row. Although for other write sequence examples, the data size may be equal to the capacity of one column, or storage device. In yet other examples, the data size may be equal to the capacity of a subdivision of one column, or storage device, such as a single byte. At time t0, client 510 may send data to parity column 505 in message 520 including data to be stored in each of columns 501-504. Client 510 need not be aware of the individual components of the row. Rather, client 510 may obtain the layout of the data storage including the location of parity column 505 and the size of the row from a metadata server. After parity column 505 receives the data, at time t1, parity column 505 may calculate a new parity stripe unit and store it and/or the data in its associated temporary storage device (block 525). At time t2, parity column 505 may begin a process of forwarding a portion of data to each of columns 501-504 in messages 531-534, respectively. Each of columns 501-504 may store received data in its associated temporary storage device.

At time t3, parity column 505 may begin receiving acknowledgements from each of columns 501-504 in messages 541-544, respectively. Once all of the acknowledgements have been received, at time t4, parity column 505 may send write complete message 550 to client 510. It is noted that write complete message 550 may not be sent to the client until the new data has been received and acknowledged by the data storage devices. This ensures that the data is redundantly stored and can be recovered in the event of the failure of any single device. Subsequently, at time t5, parity column 505 may calculate the new parity values based on the new data in it's associated temporary storage device and write it to its parity stripe unit location (block 560) or, if the new parity is already stored in its associated temporary storage device, write the new parity values from its associated temporary storage device to its parity stripe unit location (block 560). At time t6, each of columns 501-504 may write data from its associated temporary storage device to its data stripe unit location, completing the write transaction (block 570).

A number of error recovery scenarios will next be described. In the case of a power failure or other temporary interruption of the storage devices that occurs between time t1 and time t2, the write may be discarded. Since the transfer of the new data and/or new parity to the temporary storage devices was incomplete, the partial data may be discarded once power is restored or the interruption is cured. In the case of a power failure or other temporary interruption after time t2, processing may continue after the power is restored and the remaining steps of the algorithm may be carried out as if no failure had occurred.

In the case of a power failure combined with the failure of a storage device other than the parity storage device, the parity storage device may detect the failure and send a message to the MDS to report the device failure. Alternatively, the parity storage device may send an error message to the client in lieu of a write completion message. In response, the client may contact the MDS to report the error. Upon receiving an error message from the client or from the parity storage device, the MDS may select a new storage device to replace the failed device and cause the contents of the stripe to be rebuilt based on the data stored in the remaining storage devices. If the device failure occurs before all of the devices in the row have received and stored their respective portions of data, a complete copy of the write data may be obtained from the parity storage device to complete the write operation.

In the case of a power failure combined with the failure of the parity storage device, the MDS may recognize the failure of the parity storage device via conventional techniques such as polling, etc. and select a new storage device to replace it. The new parity storage device may recalculate parity values by reading the data from the other storage devices and storing the resulting values in the new storage location. In some embodiments parity recalculation may be performed by another device, such as the MDS.

Figure 4:
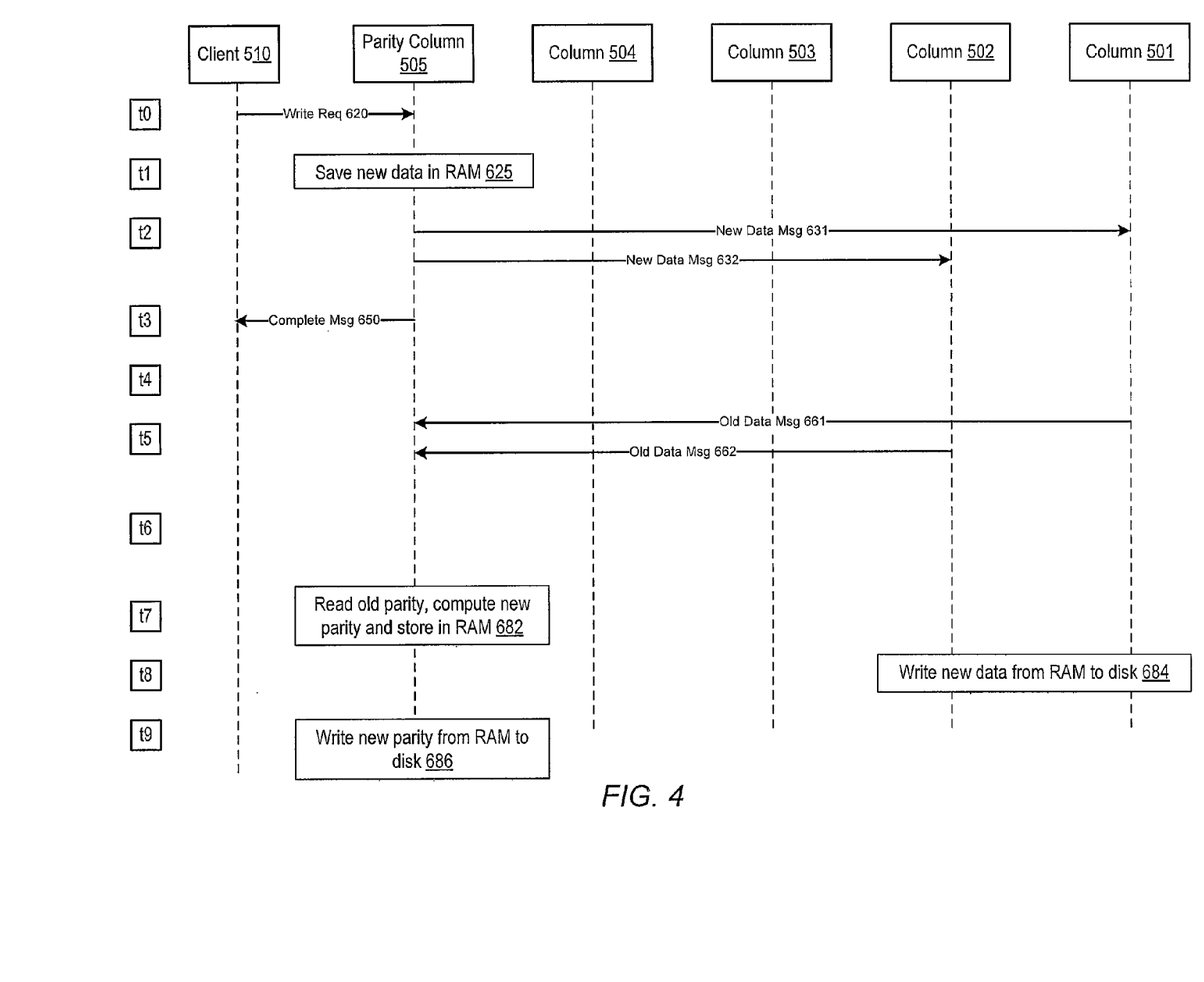
FIG. 4 is a sequence diagram illustrating one embodiment of a write transaction between a client and a partial row in a RAID-5 layout.

FIG. 4 is a sequence diagram illustrating one embodiment of a write transaction between a client and a partial row in a RAID-5 layout. In the illustrated embodiment, a client 510 is shown writing data to a row consisting of columns 501-504 and parity column 505. Here again, the data storage devices are referred to as columns 501-504 and the parity storage device is referred to as parity column 505. An array is formed with rows striped across the columns. Data storage locations within this array may be addressable by corresponding rows and columns 501-504. As described earlier, in one embodiment, each column 501-504 may be a separate computer interconnected with other columns of the array via a network.

In this example, the data size is assumed to be less than the capacity of one row. At time t0, client 510 may send data to parity column 505 in message 620 including data to be stored in each of columns 501 and 502. Client 510 may not be aware of the individual components of the row. Rather, client 510 may obtain or be told the layout of the data storage including the location of parity column 505 and the size of the data stripe unit needed to store the data from a metadata server. After parity column 505 receives the data, at time t1, parity column 505 may store the data in its associated temporary storage device (block 625).

At time t2, parity column 505 may begin a process of forwarding a portion of the data to each of columns 501 and 502 in messages 631 and 632, respectively. Each of columns 501 and 502 may later store received data in its associated temporary storage device. In various embodiments, each of columns 501 and 502 may or may not send an acknowledgment message to the parity column 505 acknowledging receipt of the messages 631 and 632. For example, in one embodiment columns 501 and 502 may receive and store data corresponding to messages 631 and 632 in a temporary buffer (e.g., NVRAM) before it is stored to disk. Once the data is safely stored in the buffer, an acknowledgement could be returned to the parity column 505. In the embodiment shown, parity column 505 conveys a write complete message 650 (corresponding to write request 620) to client 510 at time t3. It is noted that at time t3, columns 501 and 502 may not have stored to disk the new data corresponding to write request message 620 (i.e., the write complete message 650 is conveyed "early" in this sense that the message 650 is conveyed prior to the data actually being stored to its target location on disk). By conveying the write complete message 650 "early", an application running on the client 510 may continue processing sooner than would otherwise be the case and processing performance may be improved. For example, for a corresponding row of the write request message 620, columns 501-504 may be storing old data represented simply as A, B, C, and D respectively. A current parity value may be stored in a corresponding row of parity column 505. This value may be represented simply as (A+B+C+D), wherein the symbol "+" indicates a bit-wise binary exclusive-or operation. New data sent to columns 501 and 502 via messages 631 and 632 may be represented simply as A' and B'. Subsequently, each of data columns 501 and 502 may send a copy of the old data that was stored in its associated data storage location to parity column 505 in messages 661 and 662, respectively. In one embodiment, messages 661 and 662 may be utilized as acknowledgment notifications in addition to conveying the old data. Upon receiving messages 661 and 662, the parity column 505 may be notified that the new data in respective messages 631 and 632 has been safely stored in data columns 501 and 502. In one embodiment, each of data columns 501 and 502 store the new data in non-volatile memory (NVRAM) and have not yet stored the new data to disk.

Although messages 661 and 662 are shown to be conveyed at time t5 and at a close proximity in time with one another, the actual sending of messages 661 and 662 may occur whenever it is convenient for columns 501 and 502. Both the early conveyance of the write complete message 650 and the allowance of messages 661 and 662 to be conveyed when convenient for columns 501 and 502 provide an asynchronous write operation for the array. This asynchronous write operation may add flexibility to the array, which may permit subsequent operations to occur sooner than an implementation with a synchronous write operation.

After receiving messages 661 and 662, shown for illustrative purposes at time t6, parity column 505 may or may not send acknowledgements to each of data columns 501 and 502. Subsequently, at time t7, parity column 505 may use old data received from columns 501 and 502 and new data received from client 510 to compute new parity values, storing the results in its associated temporary storage device (block 682). For example, parity column 505 may compute a partial parity value for column 501 as (A'+A) and a partial parity value for column 502 as (B'+B). Then a new parity value may be computed with these partial parity vales and the stored current parity value, such as (A'+A)+(B'+B)+(A+B+C+D)=A'+B'+C+D. It is noted no data values were sent to or received from the columns 503 and 504 for this write request.

At time t8, each of data columns 501 and 502 may write data from its associated temporary storage device to its data storage location (block 684). Alternatively, columns 501 and 502 may have performed this write to data store locations immediately after or at the same time as sending respective old data values to parity column 505. At time t9, parity column 505 may write the new parity values from its associated temporary storage device to its parity data storage location, completing the write transaction (block 686).

Figure 5:
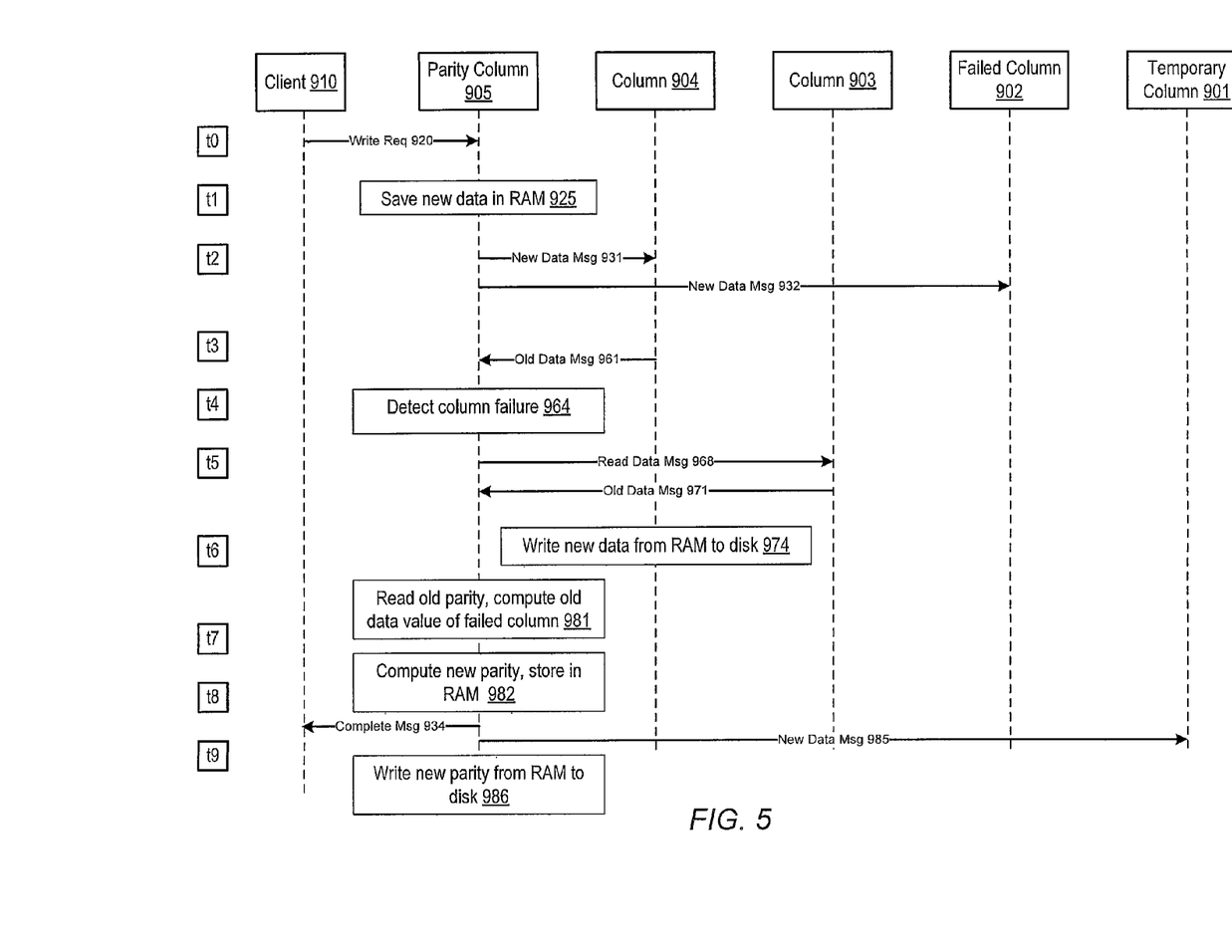
FIG. 5 is a sequence diagram illustrating one embodiment of read transaction between a client and a partial row in a RAID-5 layout with a failed component.

Turning now to FIG. 5, one embodiment of a sequence diagram for a write transaction between a client and a partial row in a RAID-5 layout with a failed component is shown. In the illustrated embodiment, a client 910 is shown writing data to a row consisting of columns 902-904 and parity column 905. Here again, the data storage devices may be referred to as columns 902-904 and the parity storage device is referred to as parity column 905. An array is formed with rows striped across the columns. Data storage locations within this array may be addressable by corresponding rows and columns 902-904. Here, only three data columns are used, whereas the previous two examples used four data columns to form the array with a RAID-5 layout. These and other implementations of a RAID-5 layout are possible and contemplated. As described earlier, in one embodiment, each column 901-904 may be a separate computer interconnected with other columns of the array via a network.

In this example, the data size is assumed to be less than the capacity of one row. At time t0, client 910 may send a write request with data to parity column 905 in message 920 to store the data in each of columns 902 and 904. In this example, parity column 905 may also be referred to as a coordinating column 905 and each of the data columns 902 and 904 may also be referred to as target columns 902 and 904. Target column 904 is marked failed, but in this example, the failure has not yet occurred or been detected. Client 910 may not be aware of the individual components of the row. Rather, client 910 may obtain or be told the layout of the data storage including the location of parity column 905 and the size of the data stripe unit needed to store the data from a metadata server, such as MDS 160. After parity column 905 receives the data, at time t1, parity column 905 may store the data in its associated temporary storage device (block 925).

At time t2, parity column 905 may begin a process of forwarding a portion of data to each of columns 902 and 904 in messages 931 and 932, respectively. No message or data may be conveyed to column 903, since the partial stripe write request does not target data storage locations within column 903. The target columns 902 and 904 may have not yet written new data corresponding to write request message 920, and parity column 905 is already conveying the write complete message 934 to client 910. In fact, target columns 902 and 904 may not have yet received the corresponding new data and the write complete message 934 is sent. By being preemptive with the write complete status by conveying message 934 early, the parity column 905 may have increased the performance of the application running on the client 910. Client 510 may now continue execution of an application depending on the write complete message 934. New read and write request messages may be sent from the client 910 to parity column 905.

Each of columns 902 and 904 may attempt to store received data in its associated temporary storage device. Similar to the example above, for a corresponding row of the write request message 920, columns 902-904 may be storing old data represented simply as A, B, and C, respectively. A current parity value may be stored in a corresponding row of parity column 905. This value may be represented simply as (A+B+C), wherein the symbol "+" indicates a bit-wise binary exclusive-or operation. New data sent to columns 902 and 904 via messages 931 and 932 may be represented simply as A' and B'. Subsequently, each of data columns 902 and 904 may attempt to send a copy of the old data that was stored in its associated data storage location to parity column 905. For example, column 904 may send old data in message 961 to parity column 905. For this example, this old data may have the value represented simply as C. Although this message is shown to be conveyed at a particular time in the sequence diagram, the actual sending of messages 961 may occur whenever it is convenient for column 904. Column 902 may not send any message since it has failed and may or may not already be moved offline. Parity column 905 detects a column failure in block 964. This detection may also have occurred prior to parity column 905 receiving message 961. By this time, MDS 160 may have been updated and parity column 905 may be aware of temporary column 901 to be the replacement for failed column 902.

At this time, parity column 905 may not be able to compute a new parity value, since it only has the currently stored parity value and old data for a single column, column 904. Parity column 905 has the currently stored parity value (A+B+C), the new data A' and C', and the old data value C. However, parity column 905 does not have the old data value A. The asynchronous write operation that may increase system performance, but it may also create this design caveat. However, in response to the detected column failure, parity column 905 may convey a read data message to all non-target columns of the write request message 920, which it previously did not do as shown in FIG. 4 in order to decrease bandwidth usage. Here, message 968 is conveyed to column 903.

When it is convenient for column 903, its stored old data corresponding to the row being written is sent to parity column 905 in message 971. Subsequently, parity column 905 may use old data received from columns 903 and 904 and new data received from client 910 to compute, or reconstruct, the old data value of the failed column 902, and storing the results in its associated temporary storage device (block 981). In one embodiment, the parity column 905 may compute the old data value for column 902 by iteratively computing partial parity values for each target column that is not failed. For example, at the beginning of a write operation, a total partial parity value corresponding to the write operation may be set to 0. Beginning with column 904, although another non-failed target column may be chosen if one exists, the new data for column 904, which is C', may be held in a non-volatile memory in parity column 905. This new value, C', may be stored only until the old data, C, arrives from column 904. At the time that the old data, C, arrives, a partial parity value may be computed, such as (C'+C). This partial parity value may be combined with the corresponding total partial parity value. In the beginning, the total partial parity value is 0, so the computed new parity value is (C'+C)+0, or (C'+C). This process may be iterative in the sense that when the parity column 905 receives old data, which may be represented generically as X, then the parity column 905 locates the stored corresponding new data, which may be represented generically as X'. The parity column 905 may compute the partial parity value (X'+X). Following, the parity column 905 may combine this partial parity value, (X'+X) with the current value for the total partial parity value.

In another embodiment, parity column 905 may compute the old data value for column 902 by first computing a partial parity value for each target column that is not failed separately, but not iteratively, such as for column 904: (C'+C). When the computation for the total partial parity value has completed, the old data value for column 902 may be reconstructed by combining the available data, such as C'+(C'+C)+B+(A+B+C)=C+B+(A+B+C)=A. Now the new parity value may be computed (block 982), such as with the partial parity values of the columns being written, such as (C'+C)+(A'+A)+(A+B+C)=C'+B+A'. Now that the new parity value is safely stored, the parity column 905 may send the write complete message 934 to client 910.

Afterward, each of data columns 904 may write data from its associated temporary storage device to its data storage location. Alternatively, column 904 may have performed this write to data store locations immediately after or soon after sending a respective old data value to parity column 905 (block 974). If temporary column 901 is online and MDS 160 reflects this information in a corresponding mapping table, then parity column 905 may send the new data A' in message 985 to temporary column 901. However, if temporary column 901 is not yet online, then message 985 may not be sent.

Also, if temporary column 901 is online, in an alternate embodiment, parity column 905 may not send message 985, since parity column now has a corresponding new parity value for the write request 920. This new parity value may be used to reconstruct any stored data corresponding to failed column 902, which may or may not come back online. At a later time, temporary column 901 or failed column 902 may be determined to be the permanent replacement. The corresponding mapping information in MDS 160 may be updated accordingly at that time. Parity column 905 may write the new parity values from its associated temporary storage device to its parity data storage location, completing the write transaction (block 986).

Figure 6:
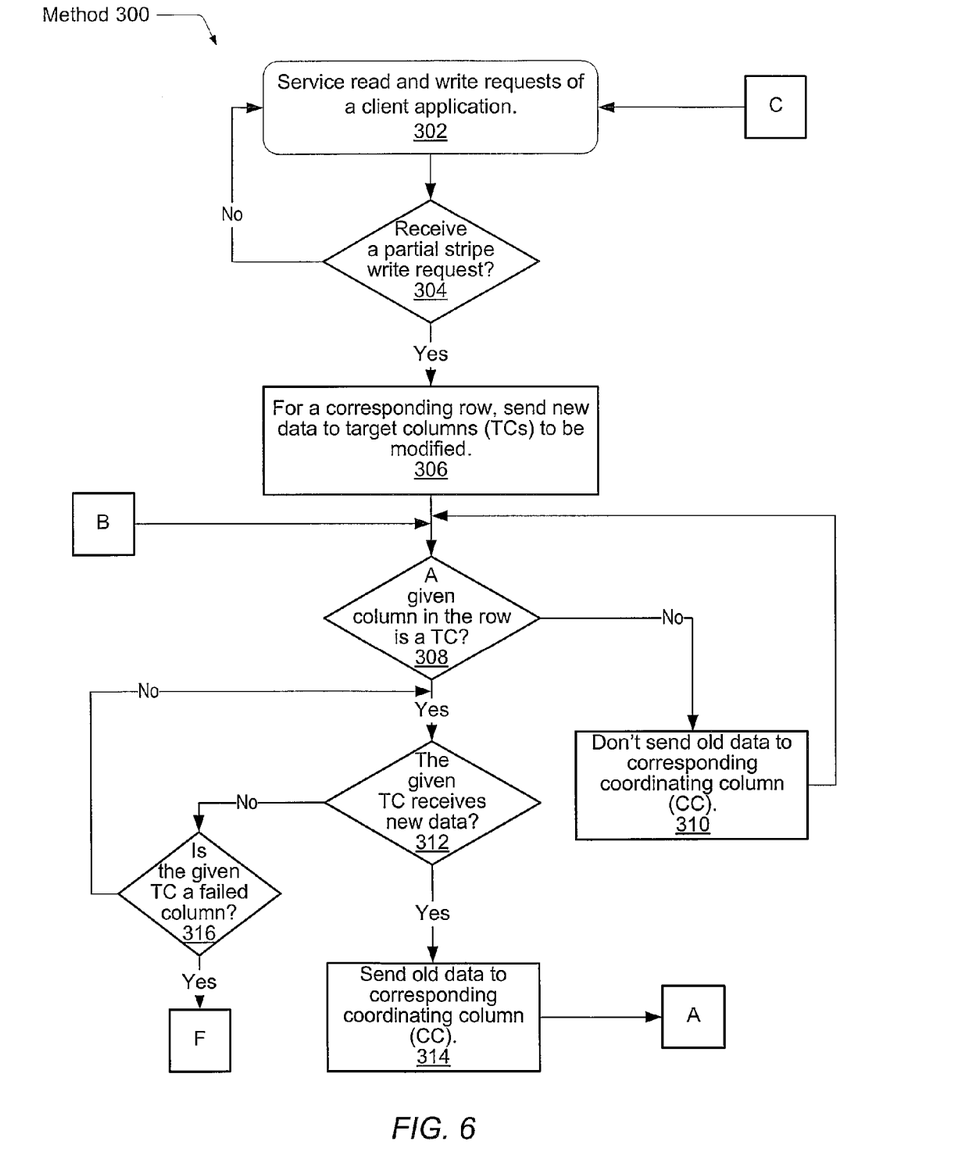
FIG. 6 is a generalized flow diagram illustrating one embodiment of a method for repairing a failed component within data storage subsystems implementing asynchronous writes without interruption of service.

Referring now to FIG. 6, one embodiment of a method 300 for repairing a failed component within data storage subsystems implementing asynchronous writes without interruption of service is shown. The components embodied in the computer system 100 described above may generally operate in accordance with method 300. For purposes of discussion, the steps in this embodiment are shown in sequential order. However, some steps may occur in a different order than shown, some steps may be performed concurrently, some steps may be combined with other steps, and some steps may be absent in another embodiment.

A computer system may comprise a data storage cluster coupled to a client. The cluster may comprise a plurality of data storage locations addressable as rows and columns in an array. In one embodiment, the array may be configured as a RAID-5 layout. Each column of the array may comprise a separate computer of a plurality of computers interconnected to each other via a network. In block 302, for a particular row, a coordinating column may process read and write requests of an application running on a client. This coordinating column may also perform parity computations for the corresponding row. The client application may convey a partial stripe write request, wherein one or more columns of a particular row may not be modified. In addition, one or more bits within a particular column may not be modified since the write request corresponds to a data size less than the stripe size.

If the coordinating column receives a partial stripe write request (conditional block 304), then in block 306, the coordinating column may forward new data to one or more corresponding target columns within the row. One or more columns may not receive any data as they are not to be modified. In one embodiment, a write complete status signal may be sent from the coordinating column to the client in response to the coordinating column receives an acknowledgment signal from each of the target columns. Again, the write complete status signal may still be sent to the client prior to the new data actually overwriting the old data within each of the target columns. The cluster has not yet performed the write operation, but the cluster has all the information for performing the write operation. By being preemptive with the write complete status, the coordinating column may have increased the performance of the application running on the client.

For a given column in the corresponding row that is not a target column (conditional block 308), in block 310, this given column does not send its corresponding stored data to the coordinating column. This given column is not to be modified, and by not sending stored data to the coordinating column, I/O bandwidth within the system may be saved. Control flow of method 300 then returns to conditional block 308. If a target column receives new data to be used to modify stored data (conditional block 312), then in block 314, this target column sends its old stored data to the coordinating column. However, this step of sending may not be immediate. Depending on the implementation, a corresponding disk storage device or computer within a network may send its old stored data when it is convenient. It is noted the order in which a target column sends old stored data to the coordinating column may not depend on the order of receiving new data. New data for a first write operation may be received by the target column followed in time by new data being received for a second write operation. However, old data for the second write operation may be sent to the coordinating column prior to the old data for the first write operation. Next, control flow of method 300 then moves to block A.

If a target column does not receive new data to be used to modify stored data (conditional block 312), and the target column is a column that has failed and not been brought back online yet (conditional block 316), then control flow of method 300 moves to block F. Otherwise, if the target column is not a column that is offline due to failure (conditional block 316), then control flow of method 300 returns to conditional block 312.

Figure 7:
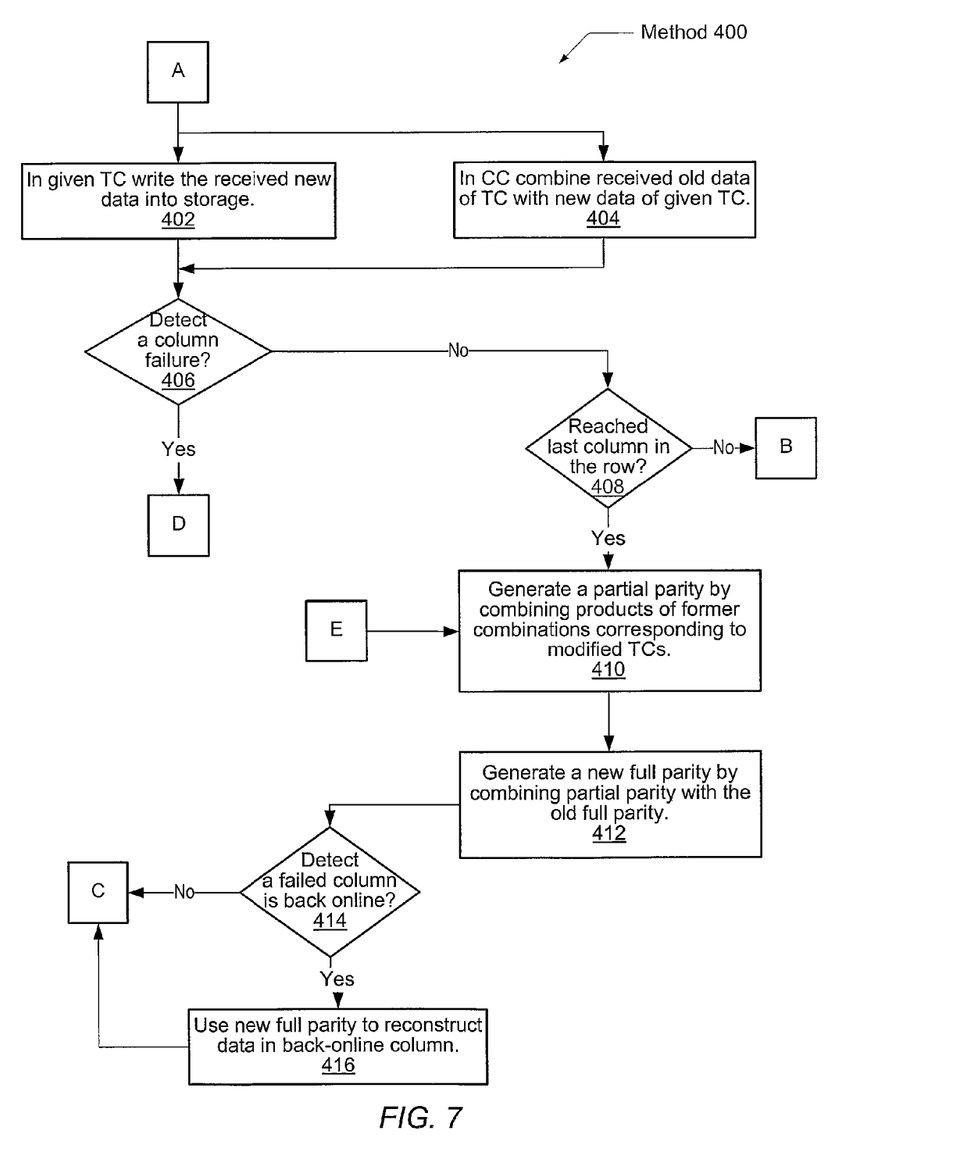
FIG. 7 is a generalized flow diagram illustrating one embodiment of a method for continuing repairing a failed component within data storage subsystems implementing asynchronous writes without interruption of service.

Turning now to FIG. 7, one embodiment of a method 400 for continuing repairing a failed component within data storage subsystems implementing asynchronous writes without interruption of service is shown. Similar to method 300, the steps in this embodiment are shown in sequential order. However, some steps may occur in a different order than shown, some steps may be performed concurrently, some steps may be combined with other steps, and some steps may be absent in another embodiment.

In order to arrive at block A, a target column receives new data to be stored within the column. In block 402, the given target column writes this new data into its corresponding storage. The target column had already sent a copy of its old stored data. Accordingly, in block 404, the coordinating column combines the received copy of the old data from the given target column with a coordinating copy of the new data for a partial parity computation. In one embodiment, as well known to those in the art, this partial parity computation may utilize a binary exclusive-or bit-wise operation. If a failure is detected for any column in the corresponding row (conditional block 406), then control flow of method 400 moves to block D. It is noted that a failure may be detected anywhere within methods 300, 400, and 700 and showing a detection in block 406 is for illustrative purposes only for one embodiment. Otherwise, if there is no failure detected and method 400 has not reached the last column in the row (conditional block 408), then control flow of method 400 moves to block B and returns to method 300.

If the last column within the corresponding row is reached (conditional block 408), then in block 410 a partial parity value based on each of the modified target columns may be computed. A simple example is given here now for illustrative purposes. A data storage cluster may comprise 4 computers interconnected in a network and the cluster may comprise a RAID-5 layout. The 4 computers may be designated columns 0 to 3. For a partial stripe write request from a client coupled to the data storage cluster, a corresponding row for the request may have column 3 designated as a coordinating column. The write request may modify columns 0 and 2, but not modify column 1. The current old data stored in columns 0, 1, and 2 may be designated as A, B, and C, respectively. The new data to be stored in columns 0 and 2 may be designated as A' and C', respectively.

In block 404 described above, the coordinating column 3, may have computed the partial parity value (A+A') for column 0 when column 3 received the old data value A from column 0. The binary operator "+" may be used to designate a bit-wise binary exclusive-or operation. Column 3 may have previously stored the new data value A' in non-volatile memory. Similarly, coordinating column 3 may have computed the partial parity value (C'+C) for column 2 when column 3 did receive the old data value C. Now in block 410, the coordinating column 3 may compute a partial parity value based on the products of the previous computations, such as (A'+A)+(C'+C).

In block 412, the coordinating column may generate a new full parity value for the write operation to be stored in the coordinating column. In the example, column 3 may be storing the previous full parity value, A+B+C. Now, column 3 may compute a new full parity value, such as (A'+A)+(C'+C)+(A+B+C). This computation yields the result A'+B+C'. With this new parity value, after a failed column is able to be brought back online, coordinating column 3 may be able to reconstruct a value stored in a data storage location addressable in the corresponding row and the previously failed column.

If a previously failed column is now back online (conditional block 414), then in block 416, the coordinating column reconstructs a corresponding value to be stored based on write operations that occurred in the row while the column was offline. For example, if column 2 failed, it is possible that one or more write operations corresponding to modifying the data value C occurred while column 2 was offline. When column 2 becomes online again, column 2 still stores the data value C, rather than a data value C', or a data value C", or other. As is well known to those in the art, the coordinating column is able to reconstruct the most up-to-date value for data value C. The coordinating column 3 performs a binary computation with bit-wise exclusive-or to perform this reconstruction.

For example, if one write operation should have written C' into column 2, but column 2 was offline, and coordinating column 3 has the new parity stored, which is A'+B+C', then the written value may be reconstructed. When column 2 is back online, it still stores the data value C or it may have no data stored. Using the stored data values in columns 0 and 1, or A' and B, respectively, and the new parity value (A'+B+C'), the coordinating column 3 may reconstruct the current value for column 2, or the value C'. Control flow of method 400 moves to block C afterwards.

Figure 8:
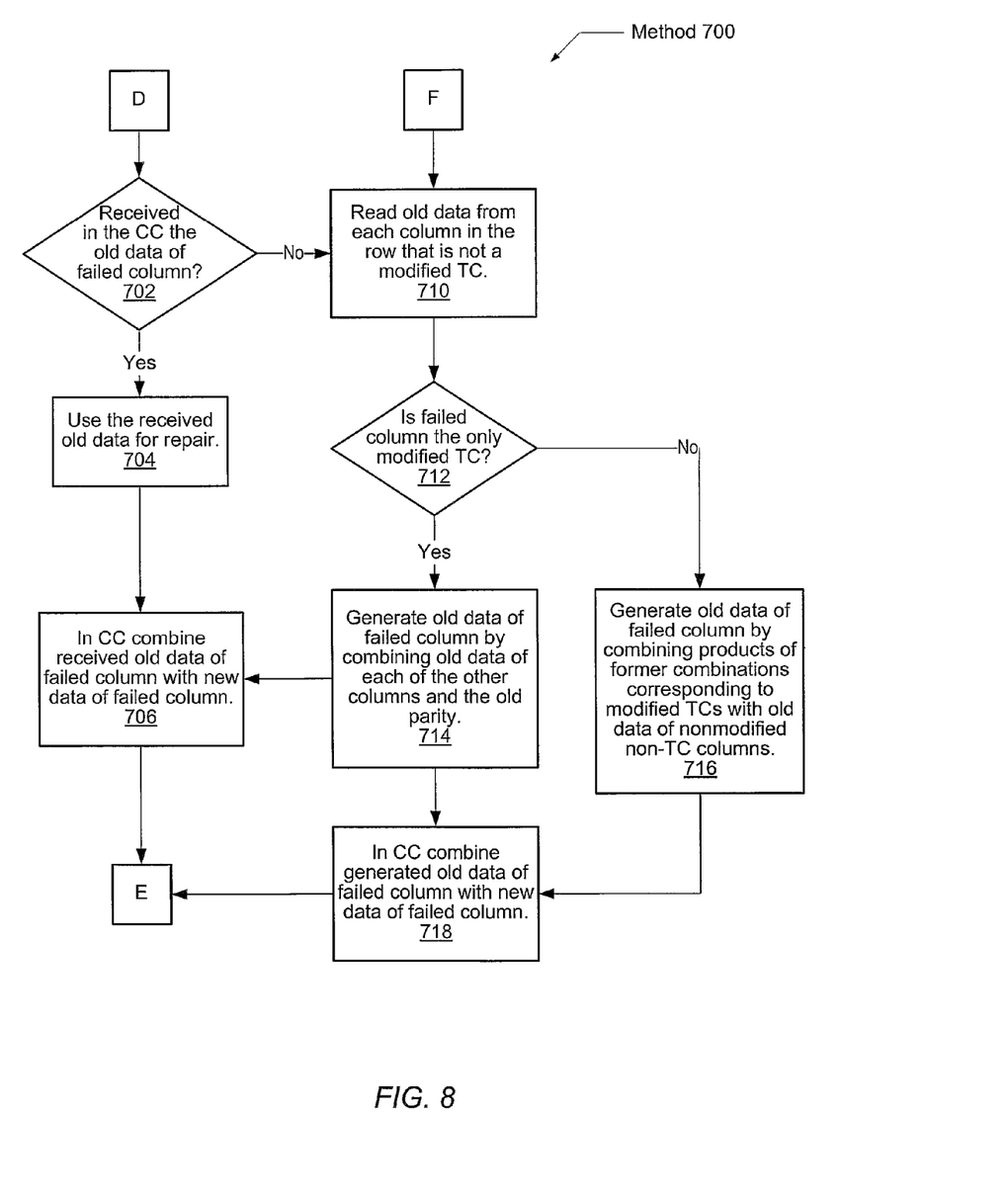
FIG. 8 is a generalized flow diagram illustrating one embodiment of a method for continuing repairing a failed component within data storage subsystems implementing asynchronous writes without interruption of service.

Referring now to FIG. 8, one embodiment of a method 700 for continuing repairing a failed component within data storage subsystems implementing asynchronous writes without interruption of service is shown. Similar to methods 300 and 400, the steps in this embodiment are shown in sequential order. However, some steps may occur in a different order than shown, some steps may be performed concurrently, some steps may be combined with other steps, and some steps may be absent in another embodiment.

In order to arrive at block D, a column failure is detected by the coordinating column, such as column 3 in the example. In order to arrive at block F, a given target column that is supposed to received new data is a failed column. A failed column may be offline temporarily and when it returns to being back online, data reconstruction may be performed.

If the old stored data of a failed target column was sent to the coordinating column before the target column failed (conditional block 702), then in block 704, the received old data value may be used for later reconstruction. For example, in block 706, the coordinating column may compute a partial parity value for the failed column, such as column 2 in the example. In the example, the coordinating column 3 may compute (C'+C) by using the new data value, C', stored in non-volatile memory and the received old data value, C. This partial parity value, (C'+C) may be used later for reconstruction when the failed column is back online. Control flow of method 700 then moves to block E and returns to method 400.

If the old stored data of a failed target column was not sent to the coordinating column before the target column failed (conditional block 702), then in block 710, the coordinating column may read the currently stored data value from each of the columns in the row that is not modified by the current write operation. For example, now coordinating column 3 may read the data value B stored in column 1. Previously, this read operation was not performed both because it was not necessary for the parity computation and it reduces I/O bandwidth usage in the system.

If the failed column is the only target column to be modified by the write operation (conditional block 712), then in block 714, the coordinating column may generate the old data value that is not received. For example, if column 2 is offline and it is the only column to be modified by a current write operation, then coordinating column 3 may reconstruct the old stored data value, such as A+B+(A+B+C)=C. Now in block 718, the coordinating column 3 may compute the new full parity value by combining the newly generated partial parity value and the old full parity value, such as (C'+C)+(A+B+C)=A+B+C'. This new full parity value may be used later to reconstruct a data value to store in column 2 when it is back online. Now, control flow of method 700 moves to block E and returns to method 400.

If the failed column is not the only target column to be modified by the write operation (conditional block 712), then in block 716, the coordinating column may generate the old data value that is not received from the failed column. However, there may be two methods to do this generation depending on whether the old stored data values of the other modified columns are available.

In the simple example, both columns 0 and 2 may be modified by the current write operation. However, column 2 is a failed column, which is offline. Coordinating column 3 may shortly receive the old stored data value A from column 0. Alternatively, coordinating column 3 may have already received the old stored data value A and has not yet combined it with the new data to generate a partial parity value, (A'+A). If this is the case, then coordinating column 3 may reconstruct the old stored data value of the failed column 2 using the old full parity value as described earlier for block 714: A+B+(A+B+C)=C.

However, if the old data value A is lost since column 0 may have overwritten it already with the new data value A' and the coordinating column 3 modified it to compute the partial parity value A'+A, then another method may be used. The coordinating column 3 may send a read request to column 0 in order to retrieve the new data value A'. Coordinating column may have lost this value when computing the partial parity value A'+A. If not, then coordinating column 3 still has this value stored.

Now, coordinating column 3 may combine the following values in order to generate the old data value of the failed column, or column 2 in the simple example: the new data values for each of the target columns to be modified by the current write operation, such as A' from column 0 in the example; the partial parity values for each of these target columns, such as A'+A in the example; the old stored data values in the columns not to be modified by the write operation, such as B from column 1 in the example; and the old stored full parity value, such as (A+B+C) from column 3 in the example. Therefore, column 3 may compute A'+B+(A'+A)+(A+B+C)=C. Now in block 718, the coordinating column 3 may compute the new full parity value by combining the newly generated partial parity value and the old full parity value, such as (A'+A)+(C'+C)+(A+B+C)=A'+B+C'. This new full parity value may be used later to reconstruct a data value to store in column 2 when it is back online.

It is noted that it is possible to have a chain of dependent write operations, wherein each operation may have not yet computed a new parity value. At this time, a failure may occur, but it is still possible to compute the required new parity values. Using the above example, it is possible that a second write operation occurs before the old data A arrives at the coordinating column. Therefore, the new data for the first uncompleted write operation is A' and C' and the new data for the subsequent second write operation may be A" and B' and C". The coordinating column may be configured to wait for all of the old data corresponding to both the first and the second write operations to arrive.

When all of the old data corresponding to the first and the second write operations have arrived, the coordinating column may have computed a partial parity value for the first write operation, such as (A'+A). The partial parity value for the second write operation is computed to be (A"+A')+(B'+B). This value may have been computed iteratively or separately and combined once all old data had arrived. For an iterative computation, read messages corresponding to the second write operation may be sent to target columns 0 and 1 in order to receive the corresponding new data lost in the iterative computation, such as A" and B'. Combining these values with the current partial parity value of (A"+A')+(B'+B) may yield (A"+A')+(B'+B)+A"+B'=(A'+B). Next, this value may be combined with both the partial parity value corresponding to the first write operation, or (A'+A), and the old parity value (A+B+C). This combination may yield (A'+B)+(A'+A)+(A+B+C)=C.

With the value, C, computed above, it is possible to compute the new full parity value of (A'+B+C') as described above regarding methods 300, 400, and 700. More specifically, block 718 of method 700 describes the computation. Moving on to the second write operation, it may be desired to compute the old data value of C'. A recursion process may be used. By combining the partial parity value computed for the second write operation, or (A"+A')+(B'+B), with the new data read from columns 0 and 1, or A" and B', we may compute the following: (A"+A')+(B'+B)+A"+B'=(A'+B). Next, this computed value may be combined with the new full parity value for the first write operation as in the following: (A'+B+C')+(A'+B)=C'. The new data value C" may be combined with this reconstructed old data value C' to form (C"+C'). This value may be combined with the partial parity value computed above for the second write operation, or (A"+A')+(B'+B), to yield ((A"+A')+(B'+B)+(C"+C')). Finally, the new full parity value for the second write operation may be computed similarly as this value was computed for the first write operation. Namely, the coordinating column may compute the new full parity value by combining the newly generated partial parity value and the old full parity value, such as ((A"+A')+(B'+B)+(C"+C'))+(A'+B+C')=A"+B'+C". This recursive process may be repeated for a third write operation, a fourth write operation, and so forth.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
    a client configured to convey read and write requests; and
    a data storage cluster coupled to receive the read and write requests, wherein the data storage cluster comprises a plurality of storage devices which include a plurality of data storage locations addressable as rows and columns in an array, wherein each respective column of the array is managed by a respective one of the plurality of storage devices;
    wherein a coordinating storage device of the plurality of storage devices is configured to:
        receive a first write request from the client, wherein the first write request includes first data targeted to a first row and a first subset of the columns in the array, wherein the first write request is not targeted to one or more of the columns of the array;
        respond to the first write request by sending a respective portion of the first data to each respective storage device that manages a respective column of the first subset of the columns, without sending data to any storage device that manages any of the one or more columns not targeted by the first write request;
        send an indication to the client that indicates that the first data corresponding to the first write request has been stored in the first row, prior to the first data being stored in the first row by the one or more storage devices that manage the first subset of the columns;
        compute one or more partial parity values for data storage locations modified by the first write request; and
        compute a full parity value for the first row that reflects the first write request, wherein said full parity value is computed based on the one or more computed partial parity values without reading data values stored in the first row from the one or more columns not targeted by the first write request.

2. The system as recited in claim 1, wherein each of the plurality of storage devices comprises a separate computer, wherein the computers are coupled to each other via a network.

3. The system as recited in claim 1, wherein the coordinating storage device is configured to compute said full parity value based on said partial parity values and a prior full parity value for the first row.

4. The system as recited in claim 3, wherein the coordinating storage device is further configured to perform the following operations after said responding to the first write request and prior to said computing the full parity value:
    receive a second write request from the client, wherein the second write request includes second data targeted to the first row and one or more of the columns in the array; and
    respond to the second write request by sending a respective portion of the second data to each respective storage device that manages a column targeted by the second write request.

5. The system as recited in claim 1, wherein in response to detecting a loss of a first stored data value corresponding to a storage location targeted by the first write request, the coordinating storage device is configured to compute said full parity value based on data values stored in the first row in the one or more columns not targeted by the first write request.

6. The system as recited in claim 5, wherein in response to detecting a loss of a second stored data value corresponding to a storage location targeted by the first write request, the loss occurring after computing a partial parity value based on the second stored data value, the coordinating storage device is configured to compute said full parity value based in part on a reconstructed version of the first stored data value.

7. The system as recited in claim 5, wherein the loss of the first stored data value corresponds to a failure of a first column storing the first stored data value, the failure occurring between (i) reading the first stored data value targeted by the first write request and (ii) computing said full parity value.

8. The system as recited in claim 7, wherein in response to detecting the first column has been replaced by a replacement column, the coordinating storage device is further configured to:
   reconstruct the first stored data value using the full parity value; and
   store the reconstructed first stored data value in the replacement column.

9. A method for supporting asynchronous write operations in a data storage subsystem, the method comprising:
   storing data in a plurality of data storage locations addressable as rows and columns in an array of a data storage cluster, each column of the array comprising a separate storage device of a plurality of storage devices interconnected to each other via a network;
   a coordinating storage device of the plurality of storage devices receiving a first write request from a client, wherein the first write request includes first data targeted to a first row and a first subset of the columns in the array, wherein the first write request is not targeted to one or more of the columns of the array;
   the coordinating storage device responding to the first write request by sending a respective portion of the first data to each respective column of the first subset of the columns, without sending data to the one or more columns not targeted by the first write request;
   the coordinating storage device sending an indication to the client that indicates that the first data corresponding to the first write request has been stored in the first row, prior to the first data being stored in the first subset of the columns of the first row;
   the coordinating storage device computing one or more partial parity values for data storage locations modified by the first write request; and
   the coordinating storage device computing a full parity value for the first row that reflects the first write request, wherein said full parity value is computed based on the one or more computed partial parity values without reading data values stored in the first row from the one or more columns not targeted by the first write request.

10. The method as recited in claim 9, further comprising the coordinating storage device computing said full parity value based on said partial parity values and a prior full parity value for the first row.

11. The method as recited in claim 10, further comprising; after said responding to the first write request and prior to said computing the full parity value, the coordinating storage device receiving a second write request from the client, wherein the second write request includes second data targeted to the first row and one or more of the columns in the array; and
   the coordinating storage device responding to the second write request by sending a respective portion of the second data to each column targeted by the second write request.

12. The method as recited in claim 9, wherein in response to detecting a loss of a first stored data value corresponding to a storage location targeted by the first write request, the method further comprises the coordinating storage device computing said full parity value based on data values stored in the first row in the one or more columns not targeted by the first write request.

13. The method as recited in claim 12, wherein in response to detecting a loss of a second stored data value corresponding to a storage location targeted by the first write request, the loss occurring after computing a partial parity value based on the second stored data value, the method further comprises the coordinating storage device computing said full parity value based in part on a reconstructed version of the first stored data value.

14. The method as recited in claim 12, wherein the loss of the first stored data value corresponds to a failure of a first column storing the first stored data value, the failure occurring between (i) reading the first stored data value targeted by the first write request and (ii) computing said full parity value.

15. The method as recited in claim 14, wherein in response to detecting the first column has been replaced by a replacement column, the method further comprises:
   the coordinating storage device reconstructing the first stored data value using the full parity value; and
   the coordinating storage device storing the reconstructed first stored data value in the replacement column.

16. A computer-readable storage medium storing program instructions that are executable to implement operations including:
   storing data in a plurality of data storage locations addressable as rows and columns in an array of a data storage cluster, each column of the array comprising a separate storage device of a plurality of storage devices interconnected to each other via a network;
   a coordinating storage device of the plurality of storage devices receiving a first write request from a client, wherein the first write request includes first data targeted to a first row and a first subset of the columns in the array, wherein the first write request is not targeted to one or more of the columns of the array;
   the coordinating storage device responding to the first write request by sending a respective portion of the first data to each respective column of the first subset of the columns, without sending data to the one or more columns not targeted by the first write request;
   the coordinating storage device sending an indication to the client that indicates that the first data corresponding to the first write request has been stored in the first row, prior to the first data being stored in the first subset of the columns of the first row;
   the coordinating storage device computing one or more partial parity values for data storage locations modified by the first write request; and
   the coordinating storage device computing a full parity value for the first row that reflects the first write request, wherein said full parity value is computed based on the one or more computed partial parity values without reading data values stored in the first row from the one or more columns not targeted by the first write request.

17. The computer-readable storage medium as recited in claim 16, wherein the program instructions are further executable to implement further operations including: the coordinating storage device computing said full parity value based on said partial parity values and a prior full parity value for the first row.

18. The computer-readable storage medium as recited in claim 16, wherein the program instructions are further executable to implement further operations including: after said responding to the first write request and prior to said computing the full parity value, the coordinating storage device receiving a second write request from the client, wherein the second write request includes second data targeted to the first row and one or more of the columns in the array; and the coordinating storage device responding to the second write request by sending a respective portion of the second data to each column targeted by the second write request.

19. The computer-readable storage medium as recited in claim 16, wherein in response to detecting a loss of a first stored data value corresponding to a storage location targeted by the first write request, the program instructions are further executable to implement further operations including: the coordinating storage device computing said full parity value based on data values stored in the first row in the one or more columns not targeted by the first write request.

* * * * *